(12) United States Patent
Boyer et al.

(10) Patent No.: US 7,367,312 B1
(45) Date of Patent: May 6, 2008

(54) CONTROL STRATEGY TO BETTER USAGE OF FUEL IN GASEOUS ENGINE

(75) Inventors: Brad Boyer, Canton, MI (US); William Stockhausen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/564,768

(22) Filed: Nov. 29, 2006

(51) Int. Cl.
*F02M 21/02* (2006.01)
(52) U.S. Cl. ............. 123/304; 123/527; 123/577
(58) Field of Classification Search ........... 123/304, 123/527, 577
See application file for complete search history.

(56) References Cited

U.S. PATENT DOCUMENTS

| 4,505,249 A | * | 3/1985 | Young | 123/527 |
| 4,700,672 A | * | 10/1987 | Baguena | 123/299 |
| 5,127,230 A | | 7/1992 | Neeser et al. | |
| 5,329,908 A | | 7/1994 | Tarr et al. | |
| 5,373,700 A | | 12/1994 | McIntosh | |
| 2005/0224057 A1 | | 10/2005 | Tokumaru et al. | |

FOREIGN PATENT DOCUMENTS

GB 2288374 10/1995

* cited by examiner

*Primary Examiner*—Erick Solis
(74) *Attorney, Agent, or Firm*—Julia Voutyras; Alleman Hall McCoy Russell & Tuttle LLP

(57) ABSTRACT

A method for operating a fueling system in a vehicle having an engine capable of burning gaseous fuel supplied from at least a first and second source to a direct fuel injector of the engine, the first source having a higher source pressure than the second source, the method comprises supplying gaseous fuel to the direct injector from at least the first source during a first engine demand; and supplying gaseous fuel to the direct injector from at least the second source during a second engine demand less than said first engine demand.

18 Claims, 9 Drawing Sheets

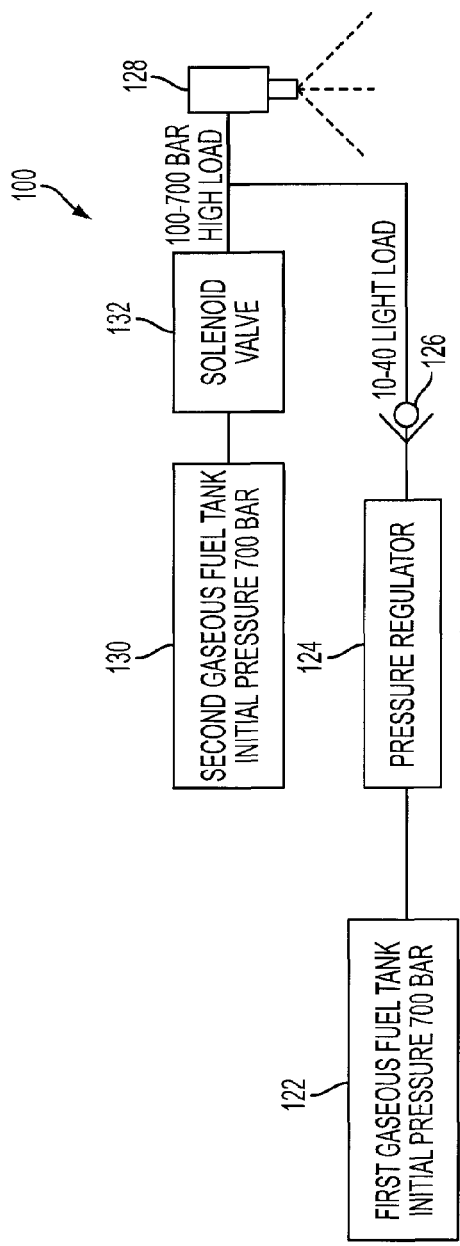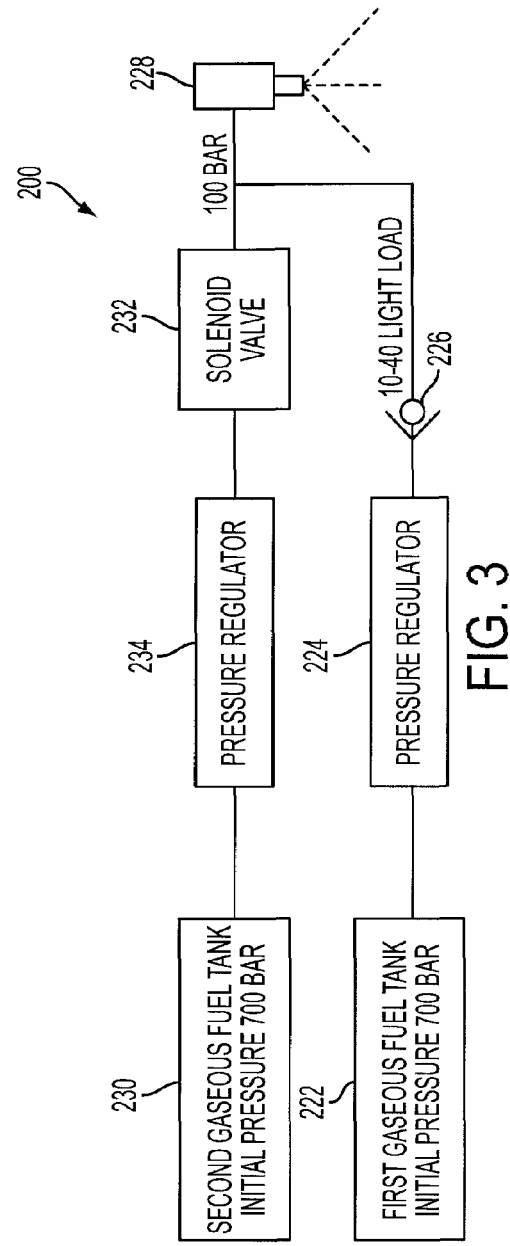

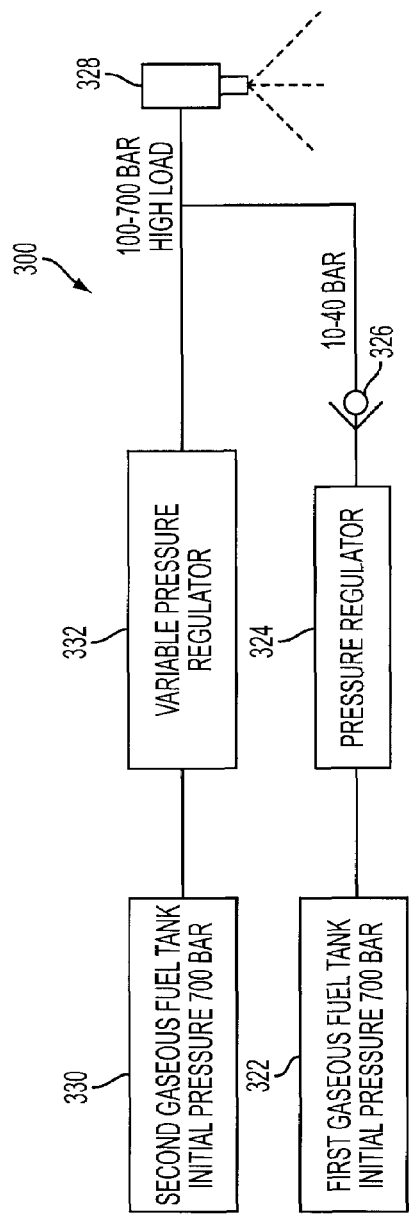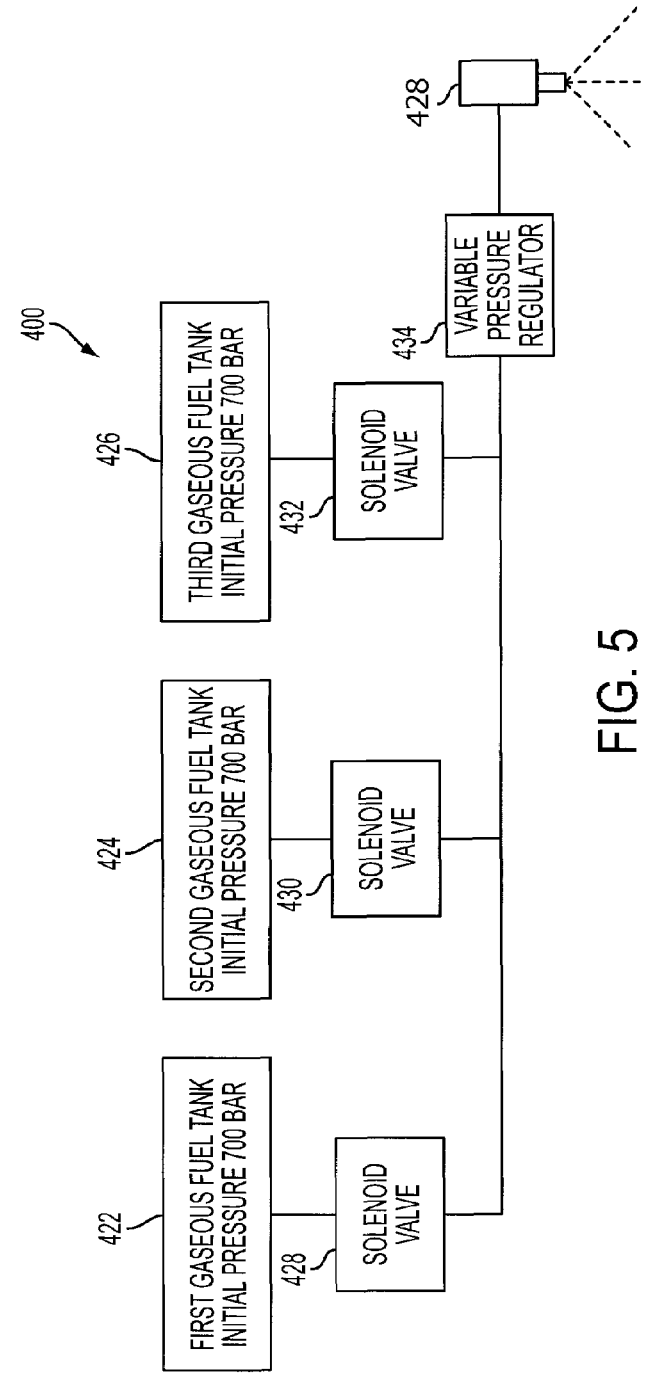
FIG. 4
FIG. 5

CONTROL STRATEGY TO BETTER USAGE OF FUEL IN GASEOUS ENGINE

FIELD

The present application relates to system and method to improve fuel usage in a vehicle having an engine capable of burning gaseous fuel.

BACKGROUND AND SUMMARY

Gaseous fueled vehicles may store fuel in one or more pressurized tanks (made from carbon fiber, for example) at maximum pressures of approximately 350 to 700 bar. For example, U.S. Pat. No. 5,127,230, describes one example of a liquid natural gas delivery system where two tanks (primary and secondary) are used. Specifically, a primary tank is selected to deliver the fuel to an engine and an automatic override system is provided whereby if the pressure in the non-selected tank rises above a predetermined level, the operator's tank selection is overridden and gas from the non-selected tank is used until the pressure falls below the predetermined level. This override system eliminates the need to vent the gas to the atmosphere when excessive pressure build up occurs.

However, the inventors herein have recognized that while the above approach may selectively utilize two storage tanks at different pressures to limit over-pressure situations, the system may also result in inefficient use of stored fuel. Specifically, depending on the fuel rail pressure and injection system, once a tank reaches a predetermined pressure at or below the injection pressure (which may be as high as 50 to 100 bar in the case of direct injection), the tank is effectively treated as empty. Thus, any remaining fuel cannot be used to operate the engine and propel the vehicle.

To address the above issues, it may be possible to selectively utilize fuel from a plurality of tanks based on engine demand, rather than, or in addition to, tank conditions such as storage pressure.

In this way, it is possible to have full engine output available, while also more completely using stored fuel. For example, even when one storage pressure falls below a desired injection pressure suitable for all operating conditions, that tank may still be used under selected engine demands (e.g., lower engine demands) while another tank at a higher pressure may be used under other engine demands (e.g., high engine demands) to replace or supplement the tank with the lower pressure. In this way, at any given point, as long as at least one storage tank has sufficient pressure, a full scope of engine output is available while allowing more complete use of stored fuel. Such operation can enable improved vehicle operating ranges (e.g., distance) with a full scope of engine output available for a given cycle.

In one example, fuel from tanks at different pressures may be selected based on specific engine loads. For example, a fuel tank with lower pressure may operate during idling and low power portions of a drive cycle, while a fuel tank with high pressure may operate at higher engine loads. In this way, it is possible to more fully utilized stored fuel and extend vehicle range while still maintaining full power capabilities.

BRIEF DESCRIPTION OF THE DRAWINGS

FIGS. 2-5 are schematic diagrams of example fuel injector and fuel supply system configurations.

DETAILED DESCRIPTION

Figure 1:
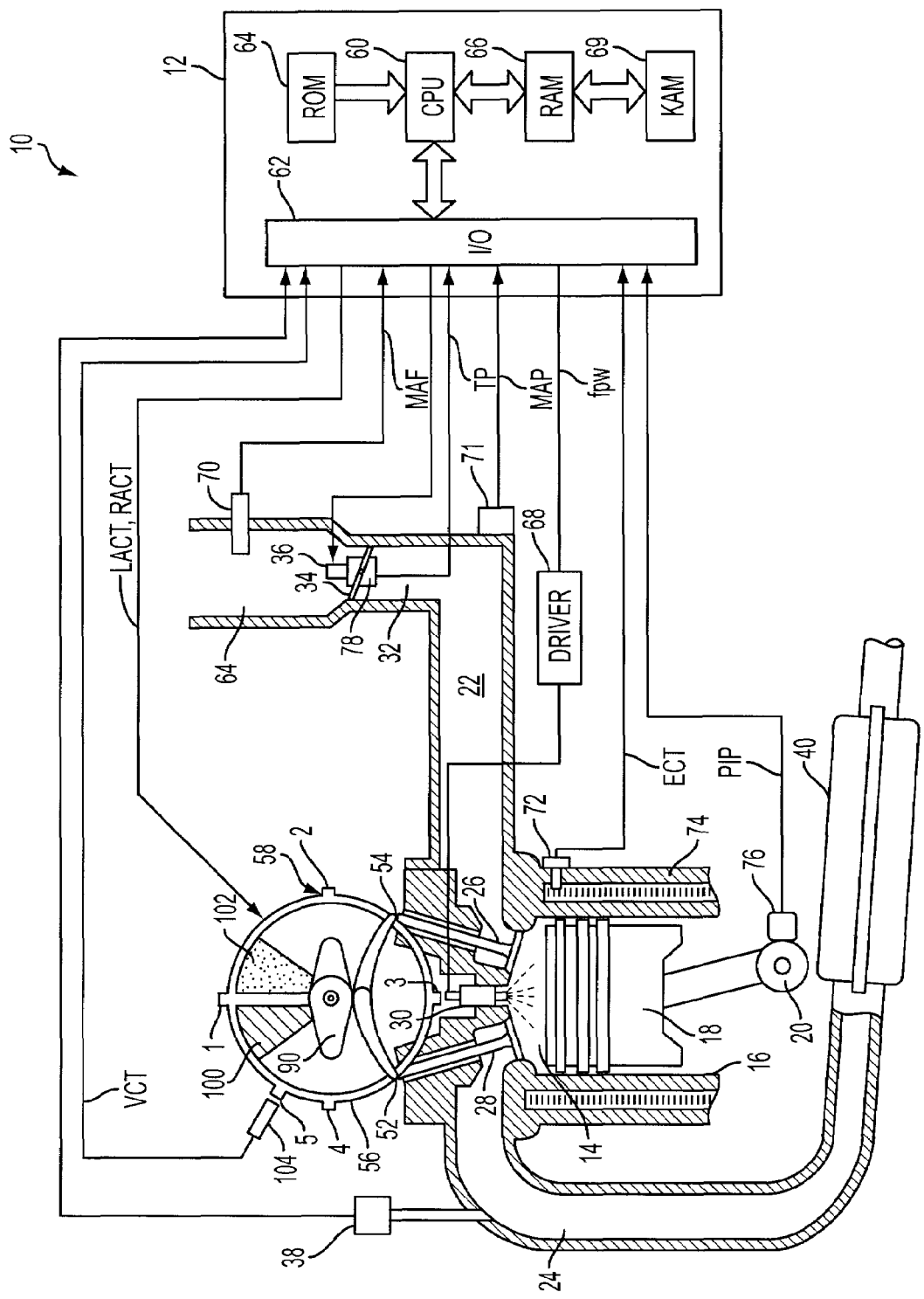
FIG. 1 is a schematic depiction of an exemplary embodiment of an engine burning gaseous fuel.

FIG. 1 shows, generally at 10, an exemplary embodiment of one cylinder of a multi-cylinder engine, intake and exhaust paths connected to that cylinder, and an exemplary embodiment of a camshaft having a variable timing mechanism for controlling the valves of the cylinder. It will be appreciated that the configuration of engine 10 is merely exemplary, and that the systems and methods described herein may be implemented in any other suitable engine. Further, the engine may be spark ignited via a spark plug located in the cylinder (not shown), the timing of which may be varied with operating conditions.

Continuing with FIG. 1, engine 10 is controlled by electronic engine controller 12. Combustion chamber, or cylinder, 14 of engine 10 is shown including combustion chamber walls 16 with piston 18 positioned therein and connected to crankshaft 20. Combustion chamber 14 is shown communicating with intake manifold 22 and exhaust manifold 24 past intake valve 26 and exhaust valve 28. Fuel injector 30 is coupled to combustion chamber 14 for delivering injected fuel directly therein in proportion to the fuel pulse width (fpw) signal received from controller 12 via electronic driver 68. Fuel is delivered to fuel injector 30 by a gasseous fuel system, described in more detail with regard to FIGS. 2-5.

Intake manifold 22 is shown communicating with throttle body 32 which contains throttle plate 34. In this particular example, throttle plate 34 is coupled to electric motor 36 so that the position of throttle plate 34 is controlled by controller 12 via electric motor 36. In an alternative embodiment (not shown), throttle body 32 and throttle plate 34 are omitted.

Exhaust gas sensor 38 is shown coupled to exhaust manifold 24 upstream of an aftertreatment device 40. Aftertreatment device 40 may include any suitable type of device for reducing emissions from engine 10. Examples include, but are not limited to, three-way and four-way catalytic converters, particulate filters, lean NOx trap, etc.

Controller 12 is shown in FIG. 1 as a conventional microcomputer, including microprocessor unit 60, input/output ports 62, an electronic storage medium for executable programs and calibration values (shown as read only memory chip 64 in this particular example), random access memory 66, keep alive memory 69, and a conventional data bus. Controller 12 is shown receiving various signals from sensors coupled to engine 10, in addition to those signals previously discussed, including measurement of inducted mass air flow (MAF) from mass air flow sensor 70 coupled to throttle body 32; engine coolant temperature (ECT) from temperature sensor 72 coupled to cooling sleeve 74; a profile ignition pickup signal (PIP) from Hall effect sensor 76 coupled to crankshaft 20; throttle position TP from throttle position sensor 78; and manifold absolute pressure (MAP) signal from sensor 71.

Engine 10 may be configured to have variable intake valve and exhaust valve timing capabilities. For example, engine 10 may include electromechanically actuated valves that are controlled by controller 12. Alternatively, as shown in the depicted embodiment, engine 10 may include a mechanism to mechanically vary the intake and/or exhaust valve timings, for example by adjusting the timing of a camshaft. In the depicted embodiment, camshaft 90 of engine 10 is shown communicating with rocker arms 52 and 54 for actuating intake valve 26 and exhaust valve 28. Camshaft 90 is directly coupled to housing 56. Housing 56 forms a toothed wheel having a plurality of teeth 58. Housing 56 is hydraulically coupled to an inner driving member (not shown), which is in turn directly linked to crankshaft 20 via a timing chain (not shown). Therefore, housing 56 and camshaft 90 rotate at a speed substantially equivalent to the inner driving member. The inner driving member rotates at a constant speed ratio to crankshaft 20. However, by manipulation of the hydraulic coupling as will be described later herein, the relative position of camshaft 90 to crankshaft 20 can be varied by control of hydraulic pressures in advance chamber 100 and retard chamber 102. For example, by allowing high pressure hydraulic fluid to enter advance chamber 100 while allowing fluid to escape from retard chamber 102, the relative relationship between camshaft 90 and crankshaft 20 is advanced. Thus, intake valve 26 and exhaust valve 28 open and close at a time earlier than normal relative to crankshaft 20. Similarly, by allowing high pressure hydraulic fluid to enter retard chamber 102 while allowing fluid to escape from advance chamber 100, the relative relationship between camshaft 90 and crankshaft 20 is retarded. Thus, intake valve 26 and exhaust valve 28 open and close at a time later than normal relative to crankshaft 40.

Teeth 58, being coupled to housing 56 and camshaft 90, allow for measurement of relative cam position via cam timing sensor 104 providing variable camshaft timing (VCT) signal to controller 12. In the depicted embodiment, four teeth (labeled 1, 2, 3 and 4) are provided for measurement of cam timing and are equally spaced (for example, 90 degrees apart from one another) while tooth 5 at a different spacing may be used for cylinder identification. In addition, controller 12 sends control signals to conventional solenoid valves (not shown) to control the flow of hydraulic fluid either into advance chamber 100, retard chamber 102, or neither.

It will be understood that FIG. 1 merely shows one cylinder of a multi-cylinder engine, and that each cylinder has its own set of intake/exhaust valves, fuel injectors, etc. It will further be understood that the depicted engine 10 is shown only for the purpose of an example, and that the systems and methods described herein may be implemented in or applied to any other suitable engine having any suitable components and/or arrangement of components. For example, intake valve 26 and exhaust valve 28 may be electromechanically actuated, and camshaft 90 (and various associated parts) may be omitted. Likewise, separate camshafts may be used to control the opening of intake valve 26 and exhaust valve 28. Where each valve is operated by a separate camshaft, each camshaft may include a variable timing mechanism such as that shown for camshaft 90 in FIG. 1 to allow the exhaust valve timing to be varied independent of the intake valve timing, and vice versa, via a variable cam timing system.

Note that the control and estimation routines included herein below can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

FIGS. 2-5 show various systems and methods that operate gaseous fuel tanks selectively to extend the vehicle range in a driving cycle while still maintaining full power capability. As noted above, gaseous-fueled vehicles may store fuel in several high pressure tanks (three to five tanks for example) at maximum pressure of 350 to 700 bar. In some cases, these tanks may be considered "empty" once they decay to the fuel rail pressure, which may be on the order of 50 to 100 bar in some examples. However, it may be possible to decouple the tanks from one another and selectively use fuel from each tank depending on the operating conditions and tank pressure so that the vehicle range in common driving cycles may be extended, as described by the example configurations of FIGS. 2-5.

FIG. 2 is a schematic diagram of a first exemplary embodiment of a fuel injector and gaseous fuel supply system with multiple fuel tanks in a vehicle, illustrating the fuel supply system 100 having two fuel tanks with a fixed low pressure and a variable high pressure fuel supply. In the depicted embodiment, a first fuel tank 122 may be coupled to a pressure regulator 124. A check valve 126 may be disposed downstream of pressure regulator 124 and upstream of a fuel injector 128. A second fuel tank 130 may be used to supply fuel to fuel injector 128 by passing the solenoid valve 132. The tanks may store gaseous fuel at the pressure range of 10-700 bar, and may contain approximately 10 kilograms of hydrogen at 700 bar initially upon a refueling event, for example.

In the depicted embodiment, the gaseous fuel tank 130 may be coupled to the fuel injector 128 directly without pressure regulation. Fuel injector 128 may include a fast response type injector. For example, the injector may incorporate piezoelectric or magnetorestrictive actuation which may result in fast response and flexible multi-event injection across broad flow and pressure ranges. In one example, an injector may deliver between 1 and 16 mg per injection within a 40 degree crank window at up to 7000 RPM at any pressure from 10 to 700 bar pressure. It should be appreciated that any suitable injectors with predictable behavior over (that can operate in a) wide pressure and pulse width range may be used.

In one example, the injector may be a piezoelectric type injector with sufficiently fast response time to enable compensation for widely varying fuel pressure, thereby reducing pressure loss from the second tank due to regulation. Further, the timing of the injection may be later in the compression stroke and in the expansion stroke (during closed intake and exhaust valve conditions just before the spark event) to enable recovery of the compressed gas energy. Such direct injection timing, can enables increased recovery of the compressed energy in the second tank via in-cylinder expansion. For example, by utilizing injection at or near top dead center of piston position in the compression stroke (of a 4-stoke cycle), improved engine efficiency may be achieved. Further details of injection timing and energy recovery are described in further detail below with regard to FIG. 9, for example.

Of course, additional injections during the cycle or alternative injection timings, and other fast-response injector designs, may also be used.

When injector operation with widely varying rail pressure is utilized, in addition to adjusting injection timing based on the injection pressure, additional adjustments based on operating conditions such as temperature and others may be used to provide accurate control of injected gaseous fuel. For example, adjustments based on exhaust gas air-fuel ratio may be used to compensate injection timing for errors, such as described herein with regard to FIGS. 7-8. By adjusting injection control in response to both the variable fuel pressure and feedback from an exhaust gas oxygen sensor, it may be possible to accurately control gaseous fuel delivery over a widely varying fuel pressure range, even in the face of widely varying fuel delivery amounts and timing across the engine speed and load range. In this way, compressed energy in the stored fuel (from tank 130) may be recovered in the cylinder while still maintaining acceptable fuel control.

Note that the above approach may be used without pressure regulation of the second tank, although it is also applicable, if not more applicable, to systems including at least some pressure regulation of the second tank, which may include variable pressure regulation (see FIG. 4). For example, under engine operating conditions of reduced injector pulsewidth, increased pressure regulation may be used, whereas during conditions of increased injector pulsewidth, reduced pressure regulation may be used, thereby enabling accurate control and increased compressed gas energy recovery when possible.

Continuing with FIG. 2, pressure regulator 124 coupled with check valve 126 may regulate fuel rail pressure to a fixed range during fuel usage from the first tank, such as during low load conditions (e.g., low engine torque demand). In one embodiment, pressure regulator 124 may regulate the pressure to a fixed range of 10-40 bar. Second fuel tank 130 coupled with solenoid valve may provide variable high pressure to fuel injector 128. In one example, second tank 130 may supply pressure in the range of 100-700 bar during increased engine load (e.g., high engine torque demands) in addition to, or in place of, fuel from the first tank. Full engine output torque may be achieved via the increased injection pressure. Thus, in the example of FIG. 2, the system operates the fuel injector substantially at the tank pressure when using the second tank (possibly in combination with the first tank), and substantially at the regulator pressure when using the first tank (with or without the second tank).

In this way, fuel tanks may be selectively used based on engine operations. For example, first tank 122 may be operated at a normal engine load or light engine load until the tank pressure is decreased to as low as 10-40 bar. On the other hands, if maximum power and/or full rail pressure is required under certain vehicle drive conditions, second tank 130 may be used together with first tank 122 to supply the required full rail pressure without power penalty. Alternatively, second tank 130 may be used alone when the maximum power and/or full rail pressure is required and then may be switched to first tank 122.

The above operation can be advantageously combined and coordinated to achieve improved vehicle range for a given amount of stored fuel, since it is possible to use a greater amount of fuel at lower pressures, when possible, while still enabling full engine output if necessary. Further details illustrating a prophetic example of extended range operation is described below with regard to FIGS. 10-12.

Referring now to FIG. 3, it shows a schematic diagram of a second exemplary embodiment of a fuel injector and gaseous fuel supply system with multiple fuel tanks, illustrating the fuel supply system 200 having two gaseous fuel tanks with a fixed low pressure and a fixed high pressure fuel supply. The depicted embodiment is similar to the system in FIG. 1 except that a pressure regulator 234 may be added between a second gaseous fuel tank 230 and solenoid valve 232. In some embodiments, when second tank 230 is used, pressure regulator 234 coupled with solenoid valve 232 may control the rail pressure to a fixed value such as 100 bar in one example. In these embodiments, the pressure applied to a fuel injector 228 may be controlled to be not greater than 100 bar.

In some embodiments, when a first gaseous tank 222 is used, a pressure regulator 224 coupled with a check valve 226 may regulate the rail pressure to a fixed range such as 10-40 bar in one example. Thus, first tank 222 may be used to supply fuel until the pressure in first tank 222 is drained to 10-40 bar. Again, injection strategies and fuel injectors as described herein may be used so that desired loads may be maintained despite rail pressure fluctuations.

FIG. 4 is a schematic diagram of a third exemplary embodiment of a fuel injector and gaseous fuel supply system with multiple fuel tanks, illustrating a fuel system 300 having two fuel tanks with fixed low pressure and variable high pressure fuel supply. The depicted embodiment is similar to the system in FIG. 1 except that the variable pressure regulator 332 instead of solenoid valve may be disposed between a second gaseous fuel tank 330 and a fuel injector 328. Variable pressure regulator 332 may adjust rail pressure in response to varied load conditions and operating range of a fuel injector 328.

As described above, the first tank 322 coupled with a pressure regulator 324 and a check valve 326 may be used at normal or light load conditions while the second tank 330 coupled with a variable pressure regulator 332 may be used at higher load conditions. When the first tank 322 is operated as a primary tank supplying fuel, the second tank 330 may operate together with the first tank 322 or alone depending on engine operating conditions and tank pressure.

Note that the variable pressure regulator 332 may communicate with engine control unit such as controller 12 as described in FIG. 1 so that desired pressure may be provided to the injector based on the engine operating conditions via controller 12. In one example, the amount of regulation or the regulation pressure may be adjusted in response to fuel tank pressure and engine operating conditions. For example, the regulation may be coordinated with fuel injector performance that may vary with engine speed and the amount of fuel to be delivered taking into account tank pressure. Thus, at higher tank pressures, higher engine speed, and/or lower fuel demand (injection amount), increased pressure regulation (e.g., a lower regulated pressure) may be provided, and vice versa. Thus, as fuel is used from the tank, pressure regulation may be decreased to the point where substantially no regulation is provided.

Figure 6:
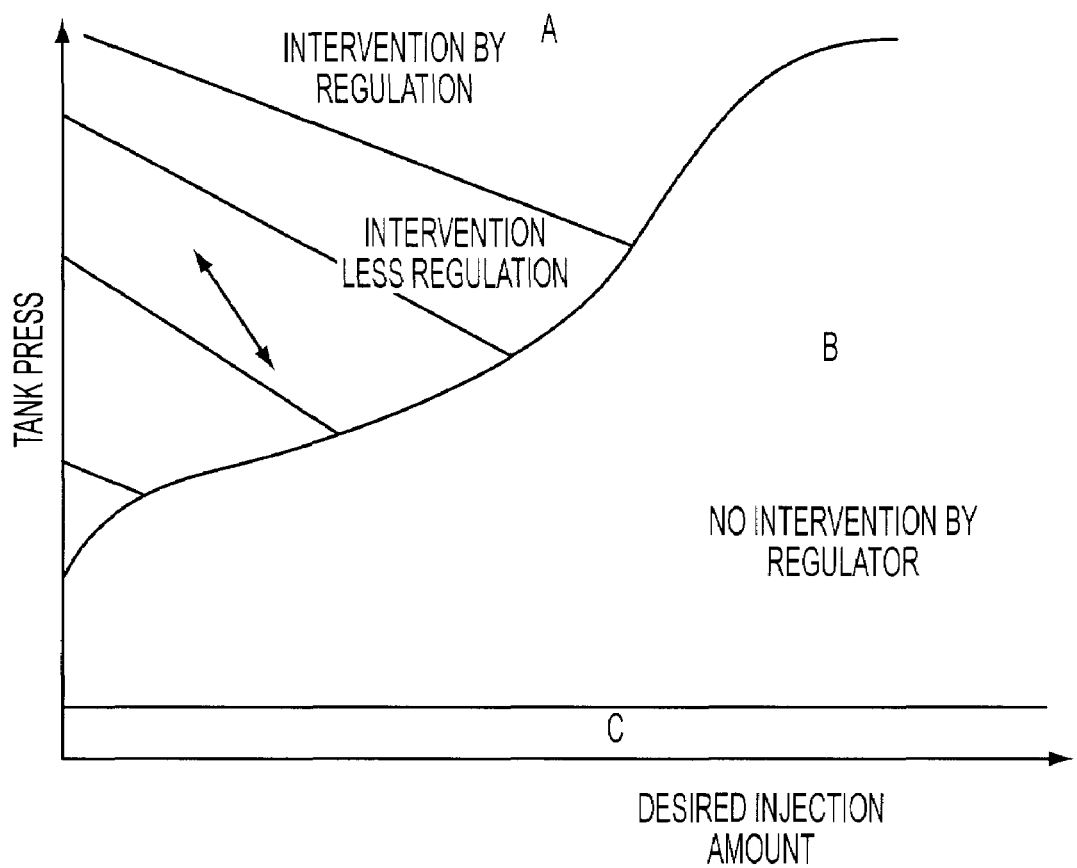
FIG. 6 is a schematic diagram illustrating variation in pressure regulation with example operating conditions.

Such a system may allow for improved use of compressed energy in the fuel tank and improved fuel delivery accuracy even under widely varying tank pressure and engine speed/load operation as illustrated in FIG. 6 below.

FIG. 5 is a schematic diagram of a fourth exemplary embodiment of a fuel injector and gaseous fuel supply system with multiple fuel tanks, illustrating the fully adjustable pressure fuel supply system 400 with three fuel tanks. In the depicted embodiment, a first fuel tank 422, a second fuel tank 424, and a third fuel tank 426 may be coupled with solenoid valves, 428, 430, and 432, respectively. Selective opening of solenoid valve in one or more tanks allow those tanks to supply fuel at tank pressure. Alternatively, a variable pressure regulator 434 may be disposed downstream of solenoid valve 432 and upstream of a fuel injector 428. In this way, the rail pressure may be regulated within an operating limitation of the fuel injector 428, adjusted in response to engine operating conditions, and adapted to injection strategies as described with reference to FIGS. 7-8.

Further, various embodiments may be possible. For examples, a variable pressure regulator or pressure regulator may be disposed in different places between fuel tanks, and solenoid valves. In another example, check valves may be used in the system.

Further, in some embodiments, one tank may be used at normal or light load conditions while another one or two tanks may be used at higher load conditions.

In some embodiments, more fuel tanks such as four or five fuel tanks may be used in the system.

Referring now to FIG. 6, it shows schematically pressure regulation activity varying with tank pressure and desired fuel injection amount. Thus, depending on the engine operating conditions, the pressure supplied to the fuel injector or the rail pressure may vary. The region which may utilize increased pressure regulation is labeled as region A, where tank pressure is higher and desired injection amount is lower. As fuel is supplied to the engine, tank pressure may decrease to a range suitable for the operation of the injector without regulation. Thus, less or no pressure regulation may be utilized as indicated in the region is labeled as region B. As tank pressure is lowered to a certain level such as 10 bar, the tank may not be able to supply desired fuel at a desired flow rate, which refers to the region labeled as region C.

For example, in some systems, when the tank is at high pressure (700 bar for example), the fuel injector may be unable to accurately deliver a low fuel flow (1 mg/injection for example). Thus, the tank pressure may be regulated in order to provide a desired fuel amount, while still enabling some energy recovery. However, as the tank pressure lowers or the injection amount increases, reduced regulation may be provided, thus increasing energy recovery.

Therefore, in some embodiments, to obtain an accurate fuel injection control with increased pressure recovery over a wide tank and engine operating range, pressure regulation devices such as the variable pressure regulator, an additional fuel tank or other suitable pressure regulation device may be selectively used. For example, the exemplary embodiments described in FIG. 4 may be advantageous in some settings by providing pressure regulation that adapts to the changes both in tank pressure and engine load.

Figure 7:
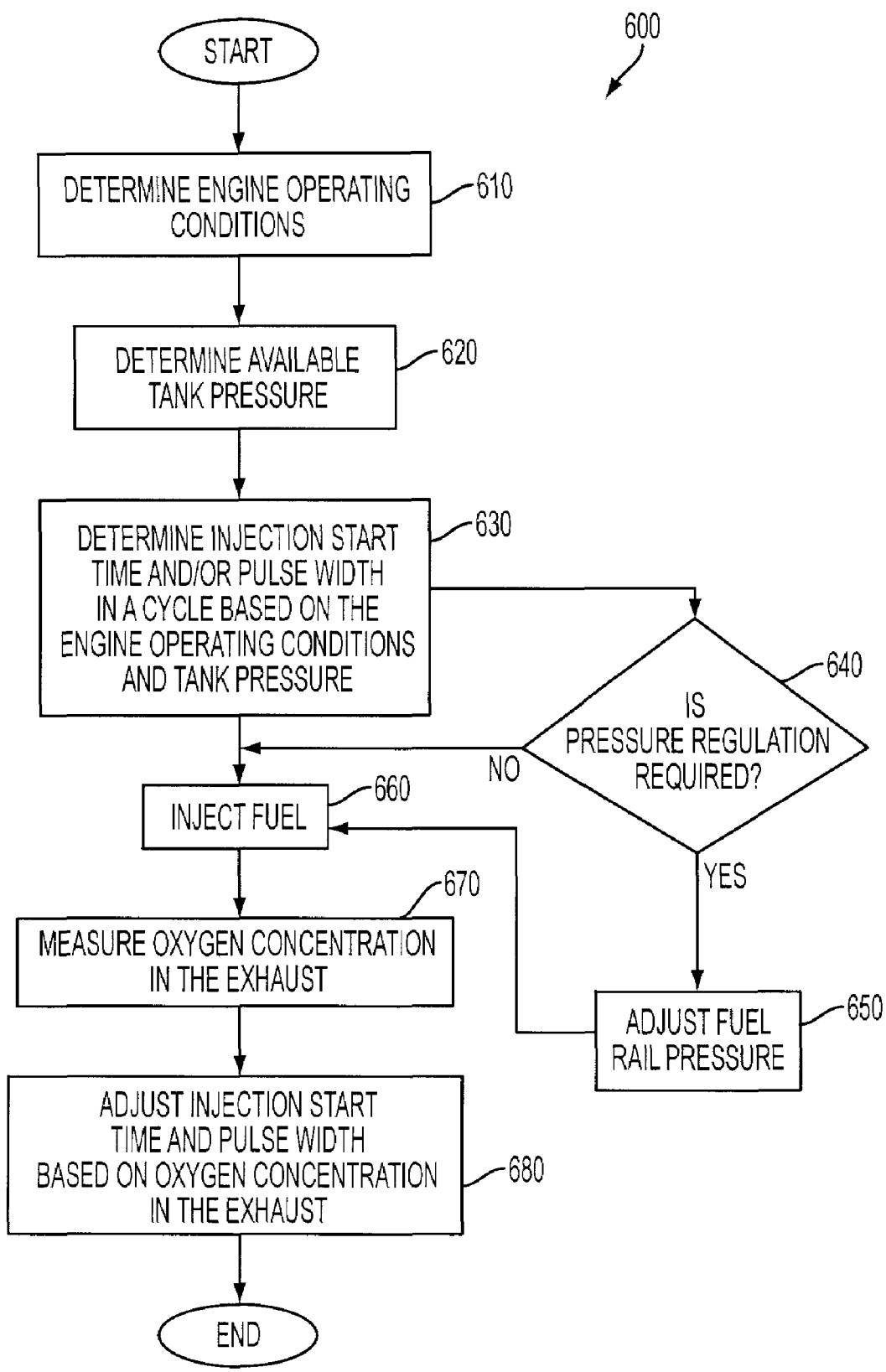
FIG. 7 is a flow diagram of one exemplary embodiment of a method to control fuel injection based on the engine operating condition and fuel tank pressure.

Referring now to FIG. 7, it shows a flow diagram of one embodiment of a method to control fuel injection based on the engine operating conditions and fuel pressure. The routine 600 first determines engine operating conditions in 610. The engine operating conditions may include engine speed, air flow rate, torque demand, etc. Next, the routine, in 620, determines tank pressure. The tank pressure, engine speed, and air flow rate may determine the amount of fuel capable of being delivered into the combustion chamber as desired.

Next, the routine, in 630, determines injection start timing and/or pulse width in a cycle based on the engine operating conditions and tank pressure. As described above, the fuel injector may have operating limitations. Thus, tank pressure or fuel rail pressure supplied to the fuel injector may affect the delivery of fuel into a cylinder. However, the injection start time and injection duration may be varied to provide the required fuel based on tank pressure or fuel rail pressure at specific operating condition. For example, it may be possible to inject the appropriate fuel quantity per cylinder by a suitable calculation of the injection open pulse-width duration by incorporating tables of injector flow rate at various supply pressures in the engine control unit. Alternatively, other approaches such as empirical correlation between injector flow rate and supply pressure may be used.

In one example, the injection timing is provided to end as late as possible in the compression stroke or expansion stroke before the spark event to enable increased energy recovery. In some embodiments, injection may start as late as possible in the compression stroke or near the top dead center, which makes it possible to recover the injection pressure energy of the gaseous fuel. Therefore, in some embodiment, the fuel pressure (up to the maximum tank pressure under some conditions) may be recovered.

Similarly, spark timing may be varied to enable the desired combustion at variable tank pressure. Thus, alternatively or additionally, in some embodiments, spark timing may be determined based on operating conditions and tank pressure. Optionally, throttle settings may be varied to enable a fuel injector to operate within its performance range based on operating conditions and tank pressure.

Continuing with FIG. 6, the routine, in 640, determines whether the pressure from the fuel tank should be regulated. As described above, pressure regulation may be used depending on tank pressure, engine speed, and/or desired fuel amount in some embodiments.

Continuing with FIG. 6, if the answer to step 640 is no, the routine, in 660, injects fuel to the cylinder. If the answer to step 640 is yes, the routine, in 650, adjusts fuel rail pressure to a value suitable for the current operating conditions. Then, the routine continues to step 660 which includes injecting fuel to the cylinder. Next, the routine, in 670, measures oxygen concentration in the exhaust. The oxygen concentration may be determined by one or more oxygen sensors, for example, which may be indicative of exhaust air-fuel ratio.

Next, the routine, in 680, adjusts injection start time and pulse width based on oxygen content and/or measured air-fuel ratio. In this way, combustion may be controlled at the desired conditions such as at a desired lean, stoichiometric, or rich air-fuel ratio over widely varying tank pressure while still recovering compression energy from the fuel tank. Thus, by utilizing injection timing and/or duration adjustments in response to both the exhaust gas oxygen sensor and operating conditions of the fuel system, such as fuel injection pressure, it is possible to achieve accurate fuel amount delivery while also enabling delivery during conditions that enable improved energy recovery in the engine.

Figure 8:
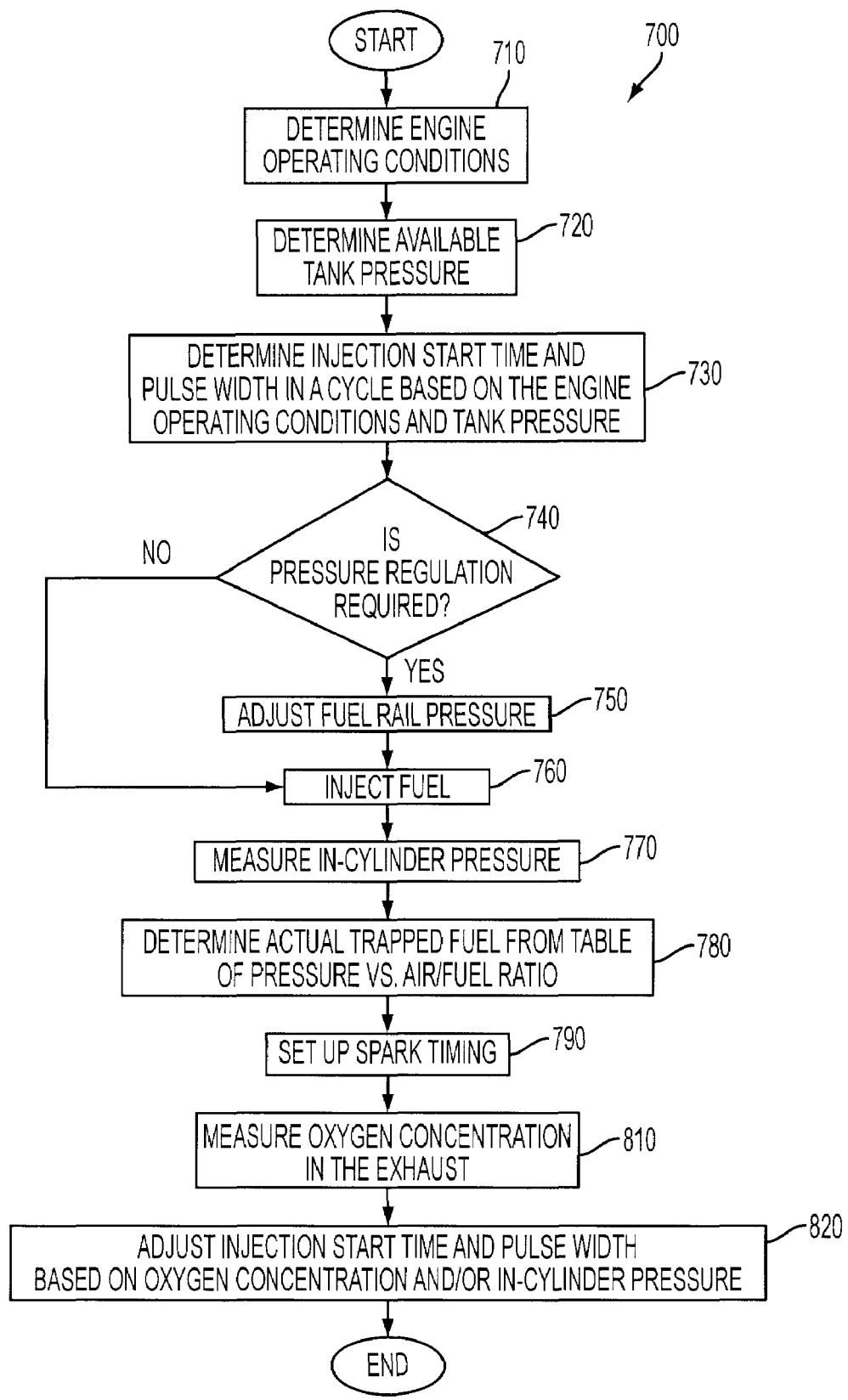
FIG. 8 is a flow diagram of another exemplary embodiment of a method to control fuel injection based on the engine operating condition and fuel tank pressure.

FIG. 8 is a flow diagram of another exemplary embodiment of a method to control fuel injection based on the engine operating condition and fuel pressure. First, the routine 700 determines engine operating conditions in 710. The engine operating conditions may include engine speed, air flow rate, torque demand, etc.

Next, the routine, in 720, determines tank pressure. The tank pressure, engine speed, and air flow rate may determine the amount of fuel capable of being delivering into the combustion chamber as desired. Then, the routine, in 730, determines injection start timing and/or pulse width in a cycle based on the engine operating conditions and tank pressure. Next, the routine, determines, in 740, whether the pressure from the fuel tank should be regulated. If the answer to step 740 is no, the routine, in 760, injects fuel to the cylinder. If the answer to step 740 is yes, the routine, in 750, adjusts fuel rail pressure to a value suitable for the current operating conditions. Then, the routine continues to step 760 which includes injecting fuel to the cylinder.

Next, the routine, in 770, measures in-cylinder pressure. Based on in-cylinder pressure, the routine, in 780, may determine the actual trapped fuel from a table of pressure versus air/fuel ratio. Then, the routine, in 790, sets up spark timing based on various conditions such as engine speed, air/fuel ratio, ambient conditions, etc. to achieve a desired combustion. Next, the routine, in 810, measures oxygen concentration in the exhaust. The oxygen concentration may be determined by one or more oxygen sensors, for example, which may be indicative of exhaust air-fuel ratio. Thus, the routine, in 820, adjusts injection start timing and pulse width based on oxygen concentration.

It should be noted that the routine may be performed in different sequences from those depicted in FIGS. 7 and 8. Also, one or more steps in the routine may be skipped or added. For example, in some embodiments, the routine 700 may skip steps 790 and 810. Thus, combustion information is obtained only from the in-cylinder pressure sensor. Alternatively, in other embodiments, following step 780, spark timing may be determined to perform desired combustion based on the actual fuel in the cylinder. Then, the routine may skip step 810 and thus adjusts injection start time and pulse width without information from measurement of oxygen concentration in the exhaust.

Figure 9:
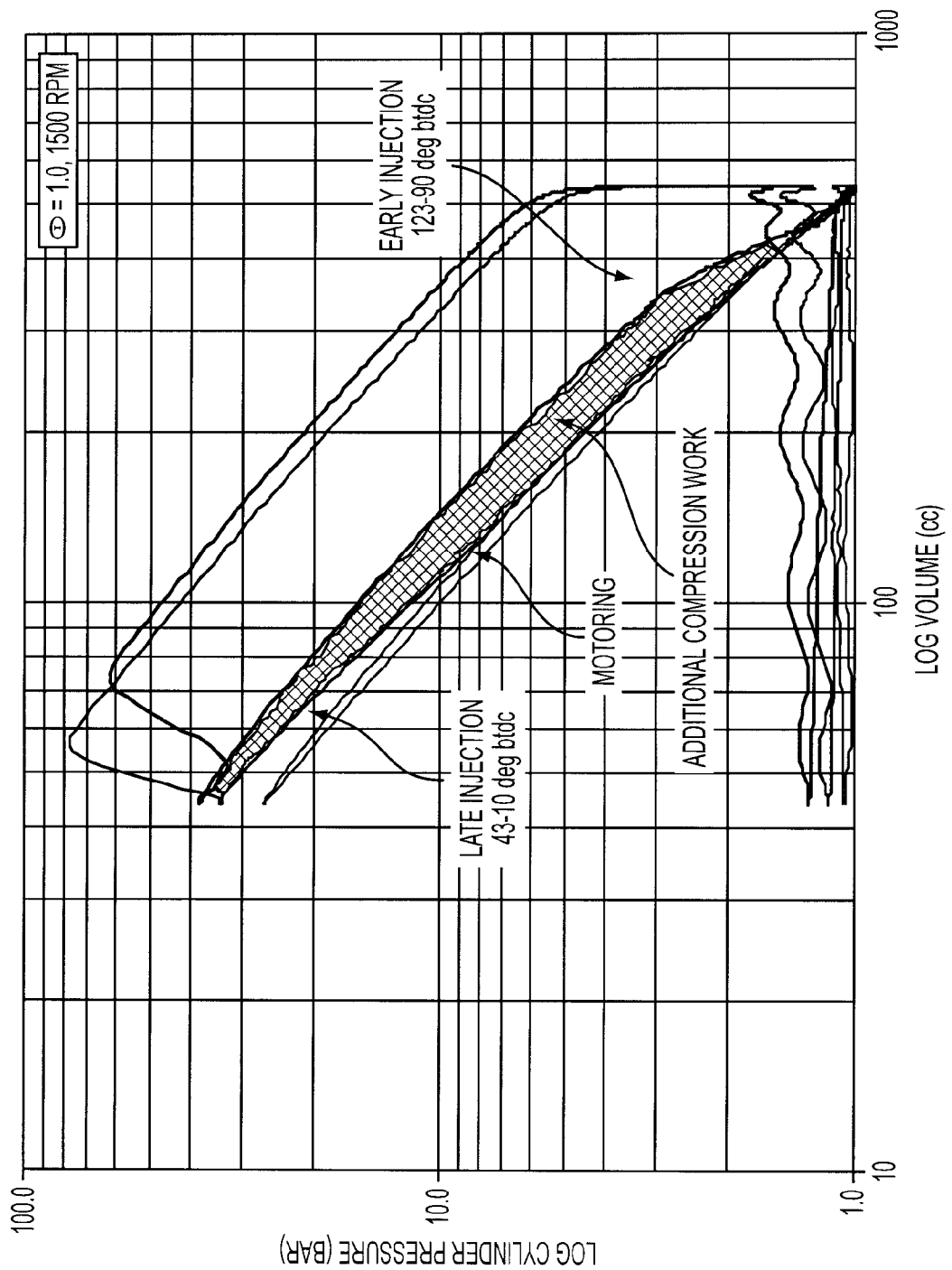
FIG. 9 shows the relationship between cylinder pressure and cylinder volume, illustrating the thermodynamic effects of injection timing.

FIG. 9 shows the relationship between cylinder pressure and cylinder volume, illustrating the thermodynamic effects of injection timing. In particular, the graph illustrates cylinder pressure versus cylinder volume at 1500 RPM and stoichiometry. Further, it illustrates the increased efficiency (less compression work required) achieved by late direct injection of fuel at increased fuel pressures, such as at fuel tank pressure, as compared with early injection for a direct injection engine. In this particular example, late end-of-injection occurs 43-10 degrees BTDC, whereas early injection occurs 123-90 degrees BTDC. Compared to work done in a port fuel injection engine, late injection improves efficiency due to less compression work required and increased expansion work preformed because of tank pressure recovery while early injection does not improve efficiency. Please note that this is just one example of early and late injection, variation in the timing is possible.

Figure 10:
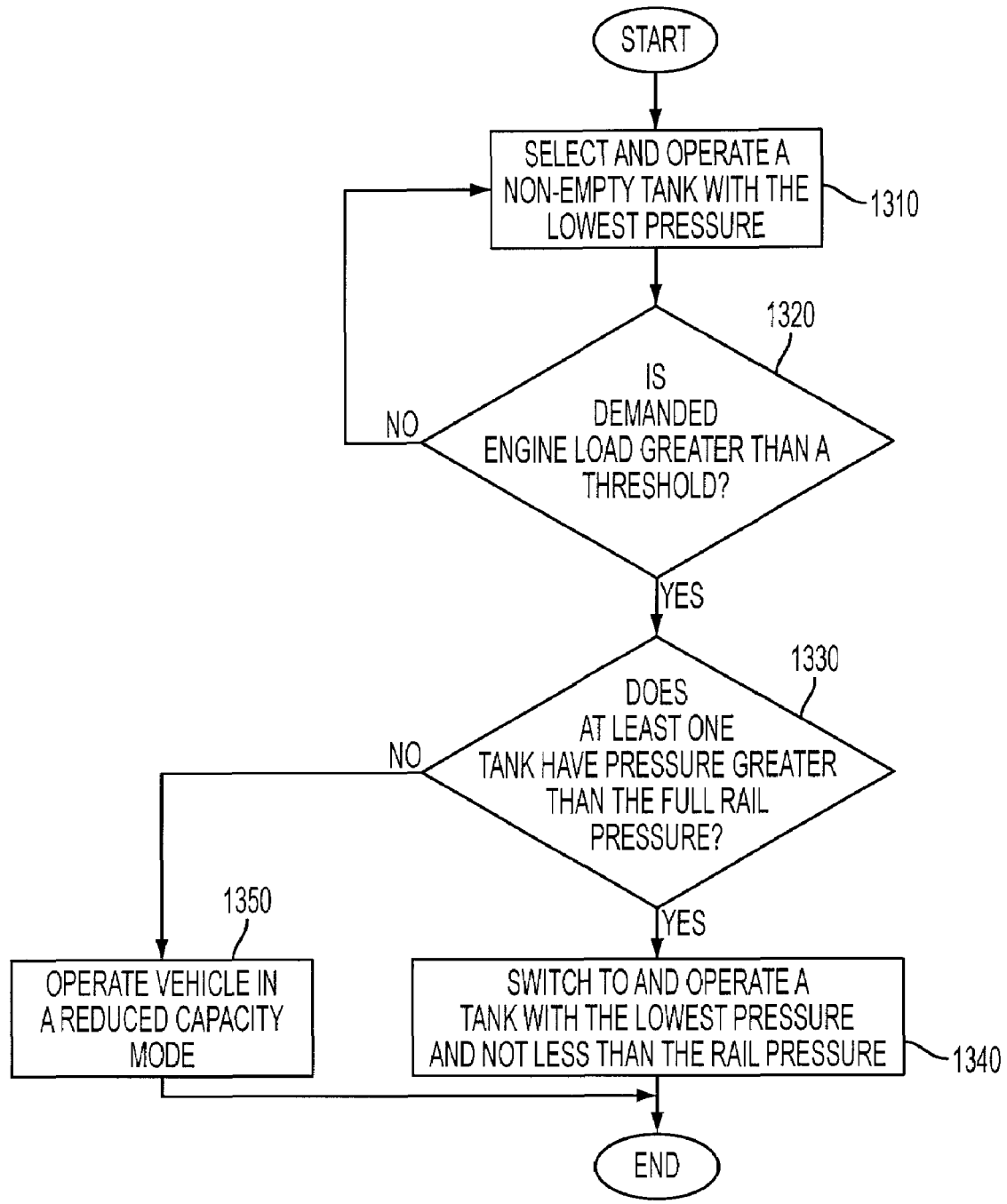
FIG. 10 is a flow diagram of one exemplary embodiment of a method to supply fuel in a fuel supply system with multiple fuel tanks.

FIG. 10 shows a flow diagram of one exemplary embodiment of a method to supply fuel in a fuel supply system with multiple gaseous fuel tanks. In 1310, the routine selects and then operates a non-empty tank with the lowest pressure, or a lower pressure compared with another tank. The non-empty tank may refer to a tank having a pressure that allows the engine to operate at a particular level of performance. The pressure below which the tank is deemed to be empty may vary depending on the fuel supply system. For example, an operating range of a fuel injector, configuration of pressure regulation, etc. may define a non-empty tank of a fuel supply system. In some embodiments, the non-empty tank refers a tank with pressure greater than 10 bar or it may be in a range of 10-40 bar. In some embodiments, the non-empty tank may have a pressure greater than a rail pressure.

Next, it may be judged in 1320 whether the demanded engine load is greater than a threshold. The threshold may be an engine load or engine torque demand that corresponds to a fuel pressure required to provide a sufficient rail pressure to operate the engine with a given performance level. In some embodiments, the threshold may be an arbitrary value such as 30 percent of maximum engine load.

If the answer to 1320 is yes, the routine further determines, in 1330, whether the pressure in at least one non-selected tank is greater than a predetermined rail pressure, or capable of supplying fuel at a pressure greater than the predetermined pressure. As described above, each tank may have separate pressure regulation, or different groups of tanks may have separate pressure regulation.

If the answer is yes, the routine, in 1340, includes switching to a tank (or group of tanks) with the lowest pressure yet still having sufficient pressure to provide rail pressure that can meet maximum engine torque demands. Once the fuel system is switched to the newly selected tank, the tank may be operated to supply fuel to meet the higher demanded engine load. Thus, the engine may be run without power penalty or with a reduced power penalty.

If the answer to 1330 is no, the routine, in 1350, includes using the first selected tank or other tanks. In this situation, the engine is operated at a fuel rail pressure below the full rail pressure, and thus the vehicle may be operated in reduced capacity mode.

As the routine repeats, the tanks elected in 1340 is maintained as the primary tank supplying fuel until the engine load demanded falls below the threshold, at which point the system may again select the tank with the lowest pressure in 1310.

Figure 12:
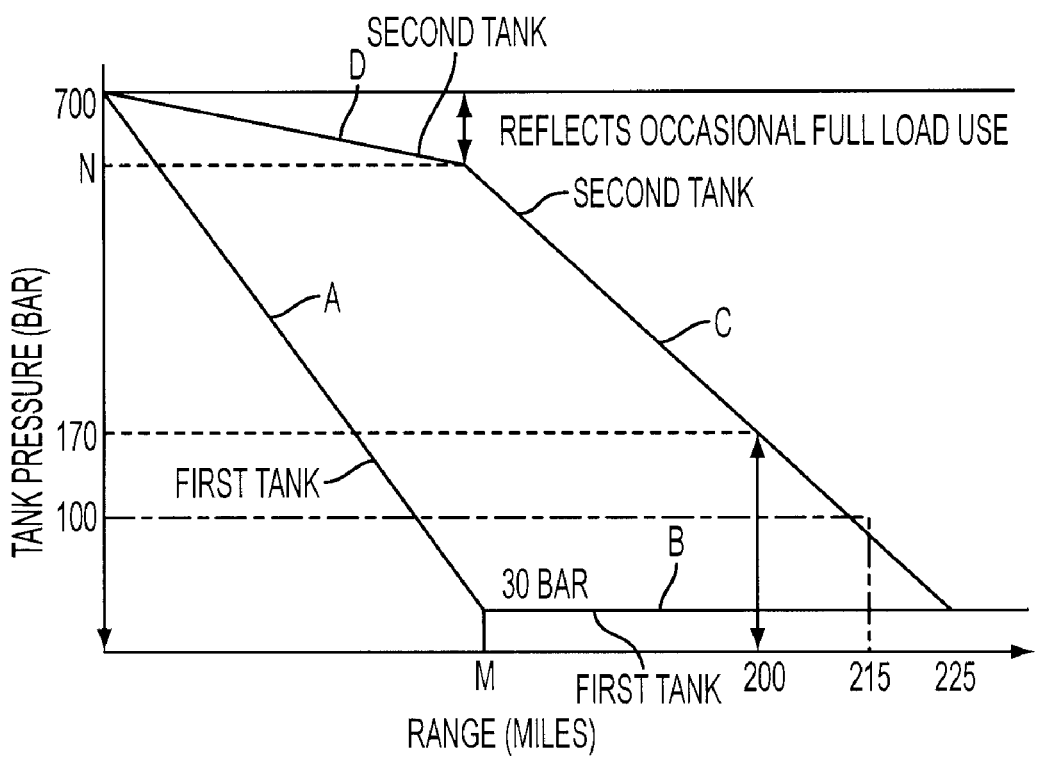
FIG. 12 illustrates the relationship between tank pressure and mileage ran by a vehicle with two fuel tank system having two stage pressure regulation.

The approach described above allows the selected fuel tank to operate at specific driving conditions. As described above, appropriate fuel injector and injection control strategy operation may make it possible to operate a fuel injector at wider range of rail pressure. In one example, the fuel injector may operate to rail pressures as low as 10-30 bar. As a result, fuel tanks with lower pressures may operate during idling and lower power or torque portions of a drive cycle. Thus, it is possible to drain the first tanks used to a "more empty" condition. As illustrated in FIG. 12 below, selective operation of fuel tanks may extend vehicle range while still maintaining full power capability.

Figure 11:
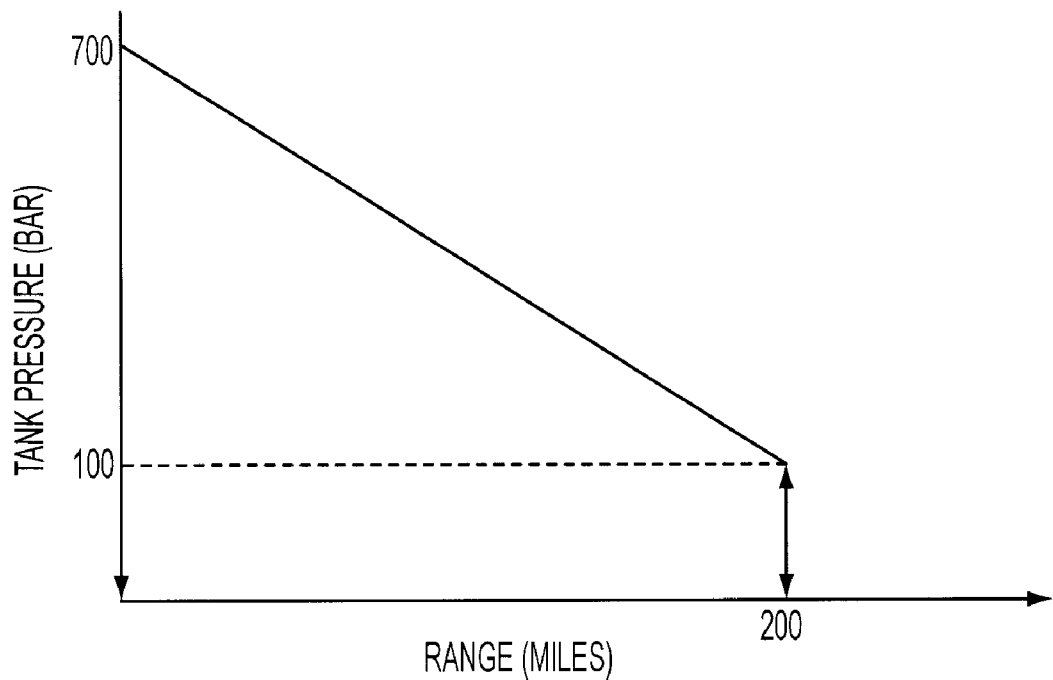
FIG. 11 illustrates the relationship between tank pressure and mileage ran by a vehicle with one fuel tank system having a fixed pressure regulator.

FIG. 11 illustrates the relationship between tank pressure and mileage traveled by a vehicle operated on a single tank system. In the illustrated example, the tank has the initial pressure of 700 bar and the rail pressure is fixed at 100 bar by a pressure regulator. The vehicle may run approximately 200 miles at a full power range before the tank pressure decreases to 100 bar. When the tank pressure is below 100 bar, the remaining fuel may be used under reduced engine output conditions, but may be unable to provide a full scope of engine torque output.

FIG. 12 illustrates the relationship between tank pressure and mileage traveled by a vehicle with a fuel system having selective operation of tanks based on tank pressure and engine operating conditions. In this example, the system includes two fuel tanks and two-stage pressure regulation.

The initial pressure in both tanks is 700 bar. In one embodiment, the engine may operate in accordance with the exemplary embodiment described in FIG. 10. As shown in FIG. 12, segments A and B illustrate the relationship between pressure in a first tank and range (miles), and segments C and D illustrate the relationship between pressure in a second tank and range (miles). The first tank may be used primarily and drained to a tank pressure of 30 bar. The mileage traveled by the first tank is indicated by point M. During the period when the first tank is used as a primary tank supplying fuel, a second tank may be used when higher loads or torque are demanded as illustrated by segment D. After point M, the second tank becomes the primary tank supplying fuel as indicated by segment C. As vehicle travels to point M, the pressure drop of the second tank from 700 bar to pressure N reflects occasional use of the second tank during the operation of the first tank when higher loads are demanded. In this example, after the vehicle travels 200 miles, the pressure in the second tank is about 170 bar. When pressure at the second tank decreases to 100 bar, the vehicle can travel 215 miles with a full scope of engine power available. Compared to the system illustrated in FIG. 11, in this example, the vehicle can travel a further distance (7.5% greater) with a full-scope of engine power available using the control strategies described herein.

It should be appreciated that fuel supply system and control strategies described above may be used in a combination injection system comprising a direct fuel injector and a port fuel injector system, which may enable greater utilization of available fuel for further increased range extension.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a fueling system in a vehicle having an engine capable of burning gaseous fuel supplied from at least a first and second source to a direct fuel injector of the engine, the first source having a higher source pressure than the second source, the method comprising:
supplying gaseous fuel to the direct injector from at least the first source during a first engine demand; and
supplying gaseous fuel to the direct injector from at least the second source during a second engine demand less than said first engine demand.

2. The method of claim 1 wherein said first source pressure is a storage pressure in a first tank, and said second source pressure is a storage pressure in a second tank.

3. The method of claim 1, wherein gaseous fuel is supplied from both the first and second sources during said first engine demand.

4. The method of claim 1 further comprising regulating source pressure of the second source.

5. The method of claim 1 further comprising adjusting injection timing based on said first source pressure during said first engine demand and adjusting injection timing based on said second source pressure during said second engine demand.

6. The method of claim 1 further comprising adjusting an injection timing based on an exhaust gas oxygen sensor during said first engine demand.

7. The method of claim 1 wherein said direct injector is a piezoelectrically actuated injector, the method further comprising supplying fuel to the piezoelectrically actuated injector without substantially regulating said first source pressure during said first engine demand, the injector directly injecting the supplied fuel without regulation to the cylinder at least during a later half of a compression stroke, and adjusting at least one of an injection time and duration based at least said first source pressure.

8. A method for operating a fueling system in a vehicle having an engine capable of burning gaseous fuel supplied from at least a first and second storage source to a direct fuel injector of the engine, the first source having a higher storage pressure and greater amount of stored fuel than the second source, the method comprising:
supplying gaseous fuel to the direct injector from at least the first and second sources during a first engine demand including peak engine torque; and
supplying gaseous fuel to the direct injector from the second source, without supplying gaseous fuel to the direct injector from the first source, during a second engine demand less than said first engine demand, said second engine demand including idling operation.

9. The method of claim 8 further comprising regulating source pressure of the second source.

10. The method of claim 8 further comprising adjusting injection timing based on said first source pressure during said first engine demand and adjusting injection timing based on said second source pressure during said second engine demand.

11. The method of claim 8 further comprising adjusting an injection timing based on an exhaust gas oxygen sensor during said first engine demand.

12. The method of claim 8 wherein said direct injector is a piezoelectrically actuated injector, the method further comprising supplying fuel to the piezoelectrically actuated injector without substantially regulating said first source pressure during said first engine demand, the injector directly injecting the supplied fuel without regulation to the cylinder at least during a later half of a compression stroke, and adjusting at least one of an injection time and duration based at least said first source pressure.

13. A system for a vehicle, comprising:
a fuel supply system having a first tank of gaseous fuel, a second tank of gaseous fuel, and a fuel rail;
an internal combustion engine including a combustion chamber;
an injector to directly inject gaseous fuel into the combustion chamber, said injector coupled to the first and second tank through the fuel rail; and
a control system to select among at least the first and second tanks to supply fuel to the engine in response to pressure in the first and second tanks and an engine output amount.

14. The system of claim 13, where the control system selects the first tank to supply fuel when the engine load is below a predetermined level and when pressure in the first tank is less than pressure in the second tank.

15. The system of claim 14, where the control system selects the second tank to supply fuel when the engine load is above a predetermined level and when pressure in the first tank is less than pressure in the second tank.

16. The system of claim 15 wherein said injector is a piezoelectrically actuated injector.

17. The system of claim 15 further comprising a pressure regulator coupled to the first tank.

18. The system of claim 15 wherein the control system further adjusts an injection timing based on injection pressure.

* * * * *